Dec. 12, 1961  H. W. LING  3,012,861
PRODUCTION OF SILICON
Filed Jan. 15, 1960
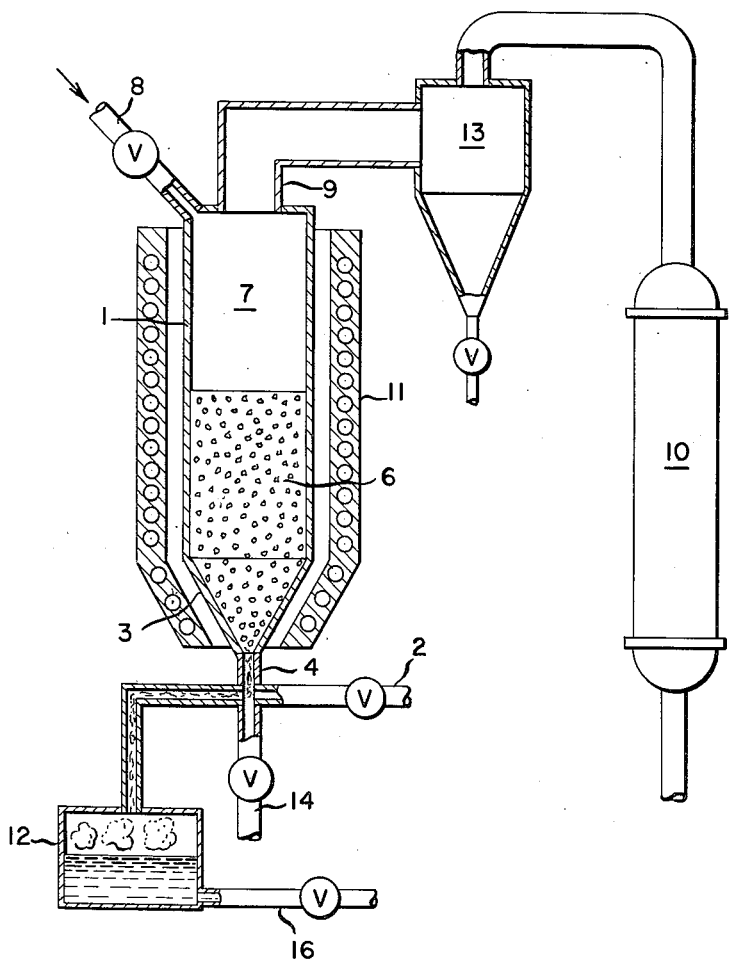
INVENTOR
HARRY W. LING
BY Francis J. Crowley
ATTORNEY

3,012,861
PRODUCTION OF SILICON

Harry W. Ling, Wilmington, Del., assignor to E. I. du Pont de Nemours and Company, Wilmington, Del., a corporation of Delaware
Filed Jan. 15, 1960, Ser. No. 3,708
9 Claims. (Cl. 23—223.5)

This invention relates to the production of elemental silicon. More particularly, it relates to a new and improved method of thermally decomposing volatile silicon compounds.

Silicon can be produced by thermally decomposing silicon iodide at a reduced pressure on an electrically heated, incandescent metal filament. In such a process the hot filament is a source of contamination for the deposited material. This contamination is especially undesirable in semiconductor grade silicon where impurity levels for certain elements must be less than a few parts per billion. Moreover, in a thermal decomposition process which uses a metal filament, the silicon must be separated from the filament by cutting or by dissolving the filament with strong acids, which results in further contamination.

It is among the objects of this invention to overcome these and other disadvantages of prior methods for producing silicon and to provide novel procedures for accomplishing such objects. It is among the particular objects of this invention to provide an improved process for obtaining elemental silicon in a state of high purity by thermal decomposition of a vaporized compound of silicon. A further object is to provide an improved method for readily producing silicon of semiconductor purity by a process adaptable to a continuous type of operation. Other objects and advantages of the invention will be apparent from the following description.

These and other objects of the invention are accomplished by the process comprising thermally decomposing a vaporized compound of silicon in the presence of a bed of elemental silicon particles fluidized by said vaporized silicon compound, and depositing the silicon product from said decomposition on said elemental silicon bed particles.

For example, the objects of the invention are accomplished by the process comprising thermally decomposing a vaporized compound of silicon selected from the group consisting of silane, halosilanes of chlorine, bromine and iodine, and silicon iodides. The vaporized silicon compound is passed into an enclosed reaction chamber containing particles of elemental silicon small enough to be fluidized and maintained in ebullient motion by the vaporized silicon compound. The reaction chamber and the silicon bed particles are maintained at the decomposition temperature of the reaction involved by external heating elements surrounding the reaction chamber. The temperature of the fluidized bed of silicon particles is maintained at least equal to the thermal decomposition temperature of the specific reactant gas under the conditions of operation, and below the melting point of silicon. Generally this is within the range of 300° C. to 1400° C. The silicon product of the decomposition reaction is deposited on the fluidized bed particles of silicon thus increasing their size until they are removed from the reaction chamber as product. If desired, a semicontinuous type of operation can be attained by withdrawing the enlarged particles from the fluidized reaction bed and replacing the bed particles on a scheduled basis. The smaller replacement particles may be advantageously made from the product particles of silicon by grinding or other form of comminution.

The figure of the attached drawing illustrates an apparatus for carrying out the process of this invention.

Referring now to this drawing, there is shown a vertically disposed cylindrical or tubular reactor 1 with a conical bottom 3 provided with inlet 4 for entrance of reactant fluidizing gas. The reactor 1 is sufficiently high to provide for a 2–3 times expansion of the bed 6 and also a disengaging space 7 above the bed 6 to reduce solids blowover to a minimum. A valved inlet 8 is provided for introduction of silicon bed particles. The reaction by-product gases are removed from the reactor through the outlet 9 and cyclone 13 which can be kept hot by a furnace (not shown). These gases then pass to a condensing system 10 and cold trap (not shown) through which the vacuum pumping system (not shown) is connected. The reactor 1 is maintained at the desired reactor temperature by external heating means 11 surrounding the vertical walls of the reactor 1. Product silicon is removed from the reactor after being deposited on the initial elemental silicon bed particles through the valved outlet 14.

The reactor 1 and associated auxiliaries such as the boiler 12 for silicon iodide vaporization, the cyclone separator 13 for trapping any solids blown past the disengaging space 7, the by-product condensing system 10 and cold trap, are made of fused silica, and welded vacuum tight connections are used throughout the system.

In operating such a process with the apparatus described above utilizing a reactor 1 where dimensions are 4 inches inside diameter and 5 feet in height, the reactor is first filled to a depth of 16 inches (static measurement) with elemental silicon particles that have been sized to $-20+25$ mesh. The system is then pumped down in pressure to less than .1 micron, while heating the reactor 1 and bed 6 by electric resistance heaters 11 to about 1000° C. Highly purified silicon iodide vapor from the boiler 12 is passed into the reactor 1 through the inlet 4 at the rate of 35 pounds per hour, as the reactant and the fluidizing medium for the silicon bed particles. The bed is thus expanded to a volume equivalent to about 32 inches in the reaction space 6. The reaction by-products comprising iodine vapor and unreacted silicon tetraiodide are removed from the disengaging space 7 to the by-product condensing system, collecting any very fine silicon blowover in the cyclone separator 13. After operating 5 hours, the particles are found to have gained 2.9 pounds in weight. The yield of silicon, based on the silicon iodide fed is about 30%. The product particles, consisting of high purity silicon are suitable for use in manufacturng electronic semiconductor devices, such as transistors, rectifiers, and the like. The unreacted silicon iodide may be recovered and reused if desired.

For a clearer understanding of the invention, the following specific examples are given. These examples are intended to be merely illustrative of the invention and not in limitation thereof.

Example 1

A fused quartz reactor of the type shown in the figure, 4 inches in diameter and 6 feet high, was filled to a depth of 16 inches with high purity silicon particles about $1/32$ of an inch in size. The system was pumped down to a pressure of less than 0.1 micron and heated to 1000° C. Silicon tetraiodide was fed to the reactor at a rate of 35 pounds per hour. After operating 100 hours, the apparatus was cooled and the bed discharged. It was found that the silicon particles had about doubled in size, and that 58 pounds of new elemental silicon were deposited on the bed particles. This is a yield of about 30% based on silicon iodide passed into the bed. The silicon product particles were of high purity, and they were suitable for the production of transistors, rectifiers and other semiconductor devices. The silicon product was ground and sized to $1/32$ inch size, and 8 pounds returned to the reactor. After another 100 hours under the above reaction conditions, there were deposited on the bed another 58 pounds of high purity semiconductor silicon.

*Example II*

The same reactor system as described in Example I was used. The silicon product from the second 100 hour run in Example I was ground and sized to give particles of about 1/32 inch diameter. Eight pounds of these 1/32 inch silicon particles were charged into the reactor 1 which was maintained at 1100° C. A stream of argon gas was passed through the silicon tetraiodide boiler 12 by means of auxiliary inlet 16, and the silicon tetraiodide in the boiler vaporized into the argon stream at such a rate that the partial pressure of the silicon iodide was less than 75 mm. The silicon tetraiodide in the argon stream then flowed to the reactor at a rate of 16.5 pounds per hour. After 10 hours of operation, the reaction was stopped, and the silicon bed particles were found to have increased in weight by three pounds, giving a 35% yield of hyperpure silicon based on the weight of the silicon iodide supplied to the bed.

*Example III*

A fused quartz reactor of the type shown in the drawing, 2 inches in diameter and 4 feet high, was filled to a depth of 5 inches with 1/64 inch particles of pure elemental silicon. The reactor was heated to 400° C. and silane ($SiH_4$) was fed to the reactor via auxiliary connection 2 and the inlet 4. The rate of introduction of silane was equivalent to 22.5 cubic feet per hour measured at standard conditions. This rate was effective in fluidizing the bed of silicon particles, giving an expansion of about 2.5 times the original volume. The reactor pressure was maintained at a pressure of 1 mm. of mercury. The silane feed rate was 2 pounds per hour, and after 10 hours of operation the bed was found to have gained 2.2 pounds of silicon, representing a yield of 14% based on the silane supplied to the bed. The product silicon was of high purity and suitable for use in manufacture of semiconductor devices such as transistors, rectifiers and the like.

*Example IV*

The reactor used was that of Example III, and it initially contained a five-inch bed of high purity silicon particles of a diameter of about 1/64 of an inch. The reactor was maintained at close to atmospheric pressure and heated to 850° C. Pure silane ($SiH_4$) was fed to the reactor at a rate of 2.6 pounds per hour, thus fluidizing the bed and expanding it to about 10 inches. After 10 hours of operation at the above conditions, the bed was found to have gained 6.8 pounds by the deposition of silicon on the particles of the bed. Some very fine silicon was collected in the cyclone separator. The product particles were of excellent semiconductor grade silicon.

*Example V*

The apparatus used is shown in the drawing. All parts were made of quartz, and the reactor component was 3 feet long with an inside diameter of 42 mm. Eighty grams of −60+100 mesh silicon particles were added to the reactor and purged with argon for 8 hours. With the reactor at 1000° C. and the bed fluidized with argon, $SiHCl_3$ was started through the reactor at a rate of about 685 grams per hour. The argon flow was decreased, and when it was determined that the $SiHCl_3$ flow was sufficient to fluidize the bed, the argon was completely shut off. A total of 6860 grams of $SiHCl_3$ was passed through the reactor in 10 hours of operation. The bed was discharged after that time, and the total Si deposited (including wall scale) was determined to be 150 grams. This weight gain corresponds to a yield of 10%, and a "make rate" of 15 grams/hr. In addition to this, a brown crystalline powder 1/3 to 1 micron in diameter was recovered in the cyclone separator and identified as silicon.

*Example VI*

Using the reactor described in Example V, 100 grams of −60+100 mesh silicon particles were added to the reactor and purged with argon for 8 hours. With the reactor at 970° C. and the bed fluidized with argon, $SiHCl_3$ was carried to the bed by diverting a portion of the argon through the $SiHCl_3$ reservoir. The total argon was supplied to the reactor at a rate of 2 liters/minute. Approximately 450 grams of $SiHCl_3$ were passed through the bed in 7 hours of operation. Upon completion of the run the bed was recovered and the total Si deposited (including a thin wall scale) was determined to be 10.3 grams. This weight gain represents an 11% yield, and a "make rate" of 1.47 g./hr. The material was characterized by converting it to single crystal form and evaluating the electrical properties. The material was sufficiently pure to be used as a raw material for electronic devices.

*Example VII*

A clear, fused quartz reactor system was used that was similar to that shown in the drawing except for the following: (a) The reactor tube was 41 mm. inside diameter and 30 inches long, (b) The lower portion of the cone of the reactor tube included a coarsely porous distribution plate that was positioned horizontally about half way up the conical bottom of the reactor tube, (c) The entire conical bottom and gas inlet system was jacketed so that coolant could be circulated around it to avoid premature reaction, (d) Above the cooled section, the vertical wall of the reactor was provided with a furnace for controlled heating of the bed.

With the furnace cold, 120 grams of pure elemental silicon in the form of particles sized to −60+100 mesh were charged into the reactor. The reactor system was evacuated and then flushed with dry hydrogen gas to remove all traces of air and moisture. The hydrogen flow was then increased to fluidize the silicon particles, discharging the hydrogen from the reactor at atmospheric pressure. Water was started through the cooling jacket to maintain the incoming gas stream and the porous plate cold. The temperature of furnace surrounding the bed was raised to 850° C. A stream of pure silane was then admixed with the inflowing hydrogen gas diluent in the ratio of 1 mol of silane per 25 mols of hydrogen, while maintaining the total pressure within the reactor slightly above atmospheric pressure and discharging the reaction product gases to atmospheric pressure. The silane feed rate was maintained 18.9 grams per hour, while holding the bed temperature constant and continuing the cooling of the gas inlet system for a period of three hours. After this period the thermal decomposition reaction was discontinued by stopping the flow of silane and cooling the entire reactor to room temperature. The bed of silicon particles was then discharged from the reactor. The discharged bed was weighed and a gain of 47.2 grams in the bed weight noted, giving a silicon deposition rate of 15.7 grams per hour and was equivalent to a conversion (silane to silicon) of greater than 95%.

During the experiment, very little (1% or less) so-called amorphous silicon was generated in the reactor and passed to the dust collector with the effluent by-product gas. The silicon particles removed from the bed were coated with the reaction deposited silicon and had the characteristic metallic appearance of macro-crystalline silicon. The bed material, when converted to single crystal form, was of excellent quality and was suitable for use in manufacturing electronic devices such as transistors, rectifiers, and the like.

The particles of silicon initially used as the fluidized bed are composed of high-purity silicon, and it is preferred that the bed particles be as high in purity as the product silicon to be deposited thereon. However, if desired, silicon of lower purity, or silicon that has been purposely doped, may be used as the initial deposition particles. The silicon particle size whch forms an easily fluidizable bed will vary, depending upon the silicon compound to be decomposed, the height of the free space above the bed, the temperature and pressure maintained within the decomposition zone, and the quantity and velocity of the gases passed into the bed. In practicing this invention, particle size can be suitably varied to conform to the particular conditions employed and the ultimate size of silicon product desired.

The silicon product from the process of this invention may be recovered as a single batch, or a portion of the bed particles may be removed from the system in a continuous or semi-continuous manner. If desired, recovered bed particles may be sized, and the smaller fractions returned to the reactor to receive more silicon deposit. When the system is operated under vacuum conditions, bed particles may be removed by temporarily ceasing the flow of reactant gas, bringing the pressure to atmospheric or slightly above with inert gas to prevent inleakage of air, and then removing the particles. Although it is more convenient to conduct a continuous operation at pressures which are atmospheric or slightly above atmospheric, it is also possible to operate continuously under vacuum conditions by providing the system with gas locks through which the bed particles can be introduced and removed.

If an inert diluent gas, such as helium or argon (or hydrogen, in case of silane), is used, the partial pressure of the $SiH_4$ or $SiI_4$ should be low. When using undiluted $SiH_4$ or $SiI_4$, it is preferable to carry out the decomposition under reduced pressure. For example, in the case of the decomposition of undiluted silicon tetraiodide under high vacuum, a pressure of 0.1 micron or less beyond the cold trap is preferred. In the case of undiluted silane, a pressure less than atmospheric, in the order of 5 millimeters of mercury, or less, is preferred. Atmospheric pressures and pressures up to about two atmospheres may be used, particularly when a halosilane is being decomposed. However, as the reaction pressure is lowered, yields are usually increased due to more favorable equilibrium conditions.

The vaporizable compounds of silicon utilizable in the process are silanes, the silicon iodides, the halosilanes of chlorine, bromine and iodine, and mixtures of these silicon compounds. Silanes useful in the process include $SiH_4$, $Si_2H_6$, $Si_3H_8$, $Si_4H_{10}$ and $Si_6H_{14}$. The silicon iodides contemplated for use in this invention include $SiI_4$ and $Si_2I_6$, and the halosilanes include the chlorosilanes such as $SiHCl_3$, $SiH_2Cl_2$, $SiH_3Cl$, the bromosilanes such as $SiHBr_3$, $SiH_2Br_2$, and the iodosilanes such as $SiHI_3$ and $SiH_3I$.

It has been previously disclosed herein that inert diluent gases may be used as a fluidizing gas in conjunction with the silicon compound which is to be decomposed. Such inert diluent gases include the rare gas group of the Periodic Table, such as helium, neon, argon, krypton, and the like. In the case of silane ($SiH_4$) or a homolog such as $Si_2H_6$, hydrogen is always present in the reactor due to the thermal decomposition reaction, and additional hydrogen gas may be introduced into the reactor to increase the dilution. It is, of course, recognized that mixtures of the inert diluting gases may also be used.

The preferred decomposition temperature range for silane ($SiH_4$) is about 600° C.–1200° C.; and for silicon tetraiodide it is about 850° C.–1250° C. A decomposition temperature range for halosilanes is about 500° C.–1400° C., with 750° C.–1250° C. being preferred for trichlorosilane. Temperature ranges between 300° C.–1400° C. can be advantageously employed, the specific temperature depending upon the particular silicon compound being decomposed and the concentration and the pressures used.

While electrical resistance heating is preferred as a means for controlling the temperature of the fluidized bed reaction zone, other means of heating the bed particles may be used. Thus, either direct or indirect heating means may be used. For example, gas fired heating, or high frequency induction heating may be used, if desired.

The reactant silicon compound is fed to the reactor at a temperature which is below its decomposition temperature and above its vaporization temperature at the pressure of the reaction chamber. If desired, suitable pressure reducing means can be provided in the apparatus so that vaporization of the reactant can be effected at a pressure higher than that utilized in the reaction chamber. If an inert diluent gas is used, it may be desirable to pass a controlled amount of this gas through the boiling reactant to produce a mixture of reactant and inert gas of constant composition.

In carrying out the process of this invention, it is preferred to use equipment constructed of silica. This material is obtainable in very pure form, and its use minimizes the possibility of product contamination. However, other non-contaminating structural materials may be used. For example, in the case of silane, where no corrosive reactant or reaction by-product is present, such materials as nickel may be used, particularly if the decomposition is carried out at a low temperature.

The reaction bed depth can be varied considerably. Thus, satisfactory operation on a small scale is obtained with a bed of silicon particles of about 5–16 inches (static measurement) in height. Such bed would be expanded to 1½ to 4 times its static depth by the fluidizing reactant gas. For larger scale operation much deeper beds are utilized, with corresponding increases in gas velocity.

The process of this invention provides many advantages over prior methods of producing silicon by thermal decomposition. For example, this invention does not use an incandescent metal filament; therefore, it eliminates the step of removing residual filament material from the silicon. Moreover, there can be no contamination by diffused impurities from the filament. Another advantage is the adaptability of the process to semi-continuous and to continuous types of operation. Still further, high rates of deposition are obtained with a small size reactor.

Since it is obvious that many changes and modifications can be made in the above-described details without departing from the nature and spirit of the invention, it is to be understood that the invention is not to be limited to said details except as set forth in the appended claims.

This case is a continuation-in-part of my copending application Ser. No. 727,990, filed April 11, 1958, now abandoned.

I claim:

1. A process for producing silicon comprising fluidizing a bed of silicon particles with a vaporized silicon compound selected from the group consisting of silicon iodides, silanes, chlorosilanes, bromosilanes, and iodosilanes, said bed of silicon particles being maintained at least at the decomposition temperature of said silicon compound, decomposing said silicon compound within said bed and depositing the resulting silicon product on the fluidized particles, removing unreacted fluidizing vapor and the reaction by-products in the vapor state, and recovering said particles with the deposited silicon thereon.

2. A process for producing silicon comprising fluidizing a bed of silicon particles with a fluidizing gas composed at least in part of a vaporized silicon compound selected from the group consisting of silicon iodides, silanes, chlorosilanes, bromosilanes, and iodosilanes, said bed of silicon particles being maintained at least at the decomposition temperature of said silicon compound, decomposing said silicon compound within said bed and depositing the resulting silicon product on the fluidized particles, removing unreacted fluidizing vapor and the reaction by-products in the vapor state, and recovering said particles with the deposited silicon thereon.

3. A process for producing silicon comprising fluidizing a bed of silicon particles with a fluidizing gas composed at least in part of a vaporized silicon compound selected from the group consisting of silicon iodides, silanes, chlorosilanes, bromosilanes, and iodosilanes, said bed of silicon particles being maintained at a temperature of about 300° C.–1400° C., decomposing said silicon compound within said bed and depositing the resulting silicon product on the fluidized particles, removing unreacted fluidizing vapor and the reaction by-products in the vapor state, and recovering said particles with the deposited silicon thereon.

4. A process for producing silicon comprising fluidizing a bed of silicon particles with a fluidizing gas composed at least in part of vaporized silicon tetraiodide, said bed of silicon particles being maintained at a temperature of about 850° C.–1250° C. and under a pressure less than atmospheric, decomposing the silicon tetraiodide within said bed and depositing the resulting silicon product on the fluidized particles, removing unreacted fluidizing vapor and the reaction by-products in the vapor state, and recovering said particles with the deposited silicon thereon.

5. A process for producing silicon comprising fluidizing a bed of silicon particles with a fluidizing gas composed of vaporized silane and an inert diluent gas, said bed of silicon particles being maintained at a temperature of about 600° C.1200° C. and under a pressure less than atmospheric, decomposing the silane within said bed and depositing the resulting silicon product on the fluidized particles, removing unreacted fluidizing vapor and the reaction by-products in the vapor state, and recovering said particles with the deposited silicon thereon.

6. A process for producing silicon comprising fluidizing a bed of silicon particles with a fluidizing gas composed of vaporized silane and an inert diluent gas, said bed of silicon particles being maintained at a temperature of about 600° C.–1200° C., decomposing the silane within said bed and depositing the resulting silicon product on the fluidized particles, removing unreacted fluidizing vapor and the reaction by-products in the vapor state, and recovering said particles with the deposited silicon thereon.

7. A process for producing silicon comprising fluidizing a bed of silicon particles with a fluidizing gas composed at least in part of vaporized trichlorosilane, said bed of silicon particles being maintained at a temperature of about 750° C.–1250° C., decomposing the trichlorosilane within said bed and depositing the resulting silicon product on the fluidized particles, removing unreacted fluidizing vapor and the reaction by-products in the vapor state, and recovering said particles with the deposited silicon thereon.

8. A process for producing silicon comprising fluidizing a bed of silicon particles with a fluidizing gas composed of vaporized silane and gaseous hydrogen, said bed of silicon particles being maintained at a temperature of about 600° C.–1200° C., decomposing the silane within said bed in the presence of hydrogen and depositing the resulting silicon product on the fluidized particles, removing unreacted fluidizing vapor and the reaction by-products in the vapor state, and recovering said particles with the deposited silicon thereon.

9. A process for producing silicon comprising fluidizing a bed of silicon particles, said bed of silicon particles being maintained at a temperature of about 600° C.–1200° C., decomposing silane within said bed in the presence of hydrogen and depositing the resulting silicon product on the fluidized particles, removing fluidizing vapor and the reaction by-products in the vapor state, and recovering said particles with the deposited silicon thereon.

References Cited in the file of this patent

UNITED STATES PATENTS

| 2,340,974 | Myers | Feb. 8, 1944 |
| 2,709,676 | Krebs | May 31, 1955 |
| 2,760,846 | Richmond et al. | Aug. 28, 1956 |
| 2,895,858 | Sangster | July 21, 1959 |
| 2,904,404 | Ellis | Sept. 15, 1959 |
| 2,938,772 | Enk et al. | May 31, 1960 |

FOREIGN PATENTS

| 659,710 | Great Britain | Oct. 13, 1949 |
| 787,043 | Great Britain | Sept. 14, 1955 |
| 805,246 | Great Britain | Dec. 3, 1958 |

OTHER REFERENCES

"Fluidized Solids," article in Chemical Engineering, May 1953, pages 219–224 and 227–230.